United States Patent

[11] 3,530,881

| [72] | Inventors | Dennis C. Tanner;<br>Bryan Ernest Humphreys, Isleworth,<br>England |
|---|---|---|
| [21] | Appl. No. | 642,281 |
| [22] | Filed | May 10, 1967 |
| [45] | Patented | Sept. 29, 1970 |
| [73] | Assignee | T.K.S. (Aircraft De-Icing) Limited,<br>Isleworth, Middlesex, England |
| [32] | Priority | June 6, 1966 |
| [33] | | Great Britain |
| [31] | | 25,148/66 |

[54] LIQUID FLOW PROPORTIONING DEVICES
3 Claims, 5 Drawing Figs.

[52] U.S. Cl.................................................. 137/561,
251/118
[51] Int. Cl.................................................. F15d 1/02
[50] Field of Search.................................... 137/561,
625.3, 561.1, 608; 244/134(b); 251/118

[56] References Cited
UNITED STATES PATENTS
2,193,696  3/1940  Ramsaur ..................... 137/561
2,203,075  6/1940  Bappler ...................... 137/561
2,432,859  12/1947  Carter ......................... 137/561
456,546  7/1891  Blankerts .................... 137/608

FOREIGN PATENTS
217,654  10/1958  Great Britain............ 137/561.1

OTHER REFERENCES
NACA TN No. 1451; Boelter, Young and Iverson; pp. 14–15, July 1948.

*Primary Examiner*—M. Cary Nelson
*Assistant Examiner*—William R. Cline
*Attorney*—William R. Liberman ABSTRACT: The invention relates to a device for proportioning the flow of liquids and is primarily intended to divide in desired proportions, the flow of de-icing distributors in aerofoils of aircraft. It can, however, also be used to distribute lubricants to mechanisms having different lubrication requirements as for other purposes. The device includes a chamber having a liquid inlet and a plurality of liquid outlets. A metering device is arranged in the chamber and may include a plurality of capillary tubes which project into the chamber by different distances.

Patented Sept. 29, 1970

INVENTOR
DENNIS CAMERON TANNER AND
BRIAN ERNEST HUMPHREYS

BY William R. Liberman

ATTORNEY

INVENTOR
DENNIS CAMERON TANNER and
BRYAN ERNEST HUMPHREYS

BY William R. Lieberman

ATTORNEY

Patented Sept. 29, 1970

INVENTOR
DENNIS CAMERON TANNER and
BRYAN ERNEST HUMPHREYS

BY

William R. Liberman
ATTORNEY

3,530,881

LIQUID FLOW PROPORTIONING DEVICES

This invention relates to a device for proportioning the flow of liquids.

Liquid flow proportioning devices have many applications such as the division of the flow of lubricant to various parts of a mechanism in accordance with the lubrication requirements of these parts. Also proportioning devices are used in aircraft for dividing the flow of de-icing liquids between de-icing distributors fitted in the leading edges of the aircraft aerofoils. The present invention is therefore particularly, but not exclusively, concerned with a device for use in an aircraft for proportioning the flow of de-icing liquids.

Our prior British Pat. No. 724,019, dated July 15, 1953, relates to a de-icing distributor having a space to which de-icing liquid is supplied through an entry connector, the liquid being pumped from a central reservoir through a metering device. Hitherto, this metering device has been conveniently located in the entry connector of the distributor. Thus, each of a plurality of distributors has a separate metering device. Since the viscosity of de-icing liquids depends upon their temperature, difficulties have been experienced in accurately proportioning the flow of de-icing liquids where the reservoir is located in a warm zone of the aircraft, the metering devices being near the leading edges of the cold aerofoils.

It is an object of the invention to provide a device capable of substantially constant proportionment of liquid flow, even when liquid at one temperature in the device and associated pipelines is being displaced by liquid at another temperature from the reservoir.

It is a further object of the invention to provide a single device able to proportion liquids and supply the same to all the units in a group of units. Such units may be de-icing liquid distributors.

According to the present invention, there is provided a device for proportioning the flow of liquids, the device comprising a body, a chamber enclosed by said body, the chamber being of small capacity in relation to the intended rate of liquid flow therethrough, a plurality of metering devices in communication with said chamber, an inlet for liquid to said chamber and a plurality of outlets for liquid, each outlet being arranged to be supplied from a respective one of said metering devices.

The advantage of having a small capacity chamber is that the proportioning device rapidly reaches a state of constant flow when the liquid therein at one temperature is replaced by liquid at another temperature. Furthermore, differences in temperature throughout the chamber are negligible, and the liquid flowing through all the metering devices is at substantially the same temperature.

For use, the liquid inlet and outlets of the proportioning device are fitted with appropriate pipelines. One pipeline is arranged to supply liquid from a reservoir via a pump to the liquid inlet of the proportioning device. A plurality of other pipelines is disposed to convey liquid from the liquid outlets of the proportioning device to the various units to be supplied thereby. Where more than one proportioning device is supplied by a single pump outlet the lengths of the pipelines between the pumps and the devices are preferably inversely proportional to the expected rate of flow through these pipelines, whereby the time taken for liquid to traverse all the pipelines is the same. In this way, where liquid at one temperature in the pipelines and proportioning devices is being replaced by liquid at another temperature, the second liquid reaches the metering devices in all the proportioning devices at substantially the same time. The same is true when one liquid is being replaced by another liquid.

For a better understanding of the invention and to show how the same may be carried into effect, reference will now be made by way of example to the accompanying drawings, in which.

Figure 1:
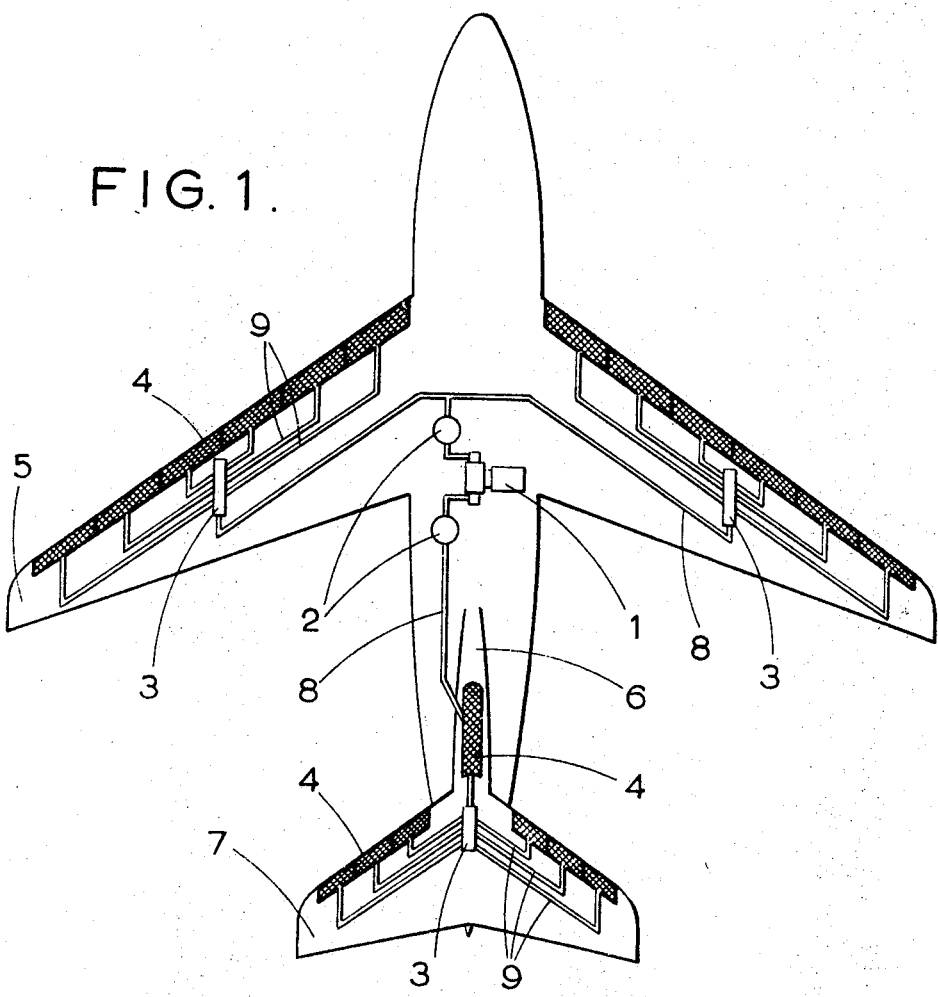
FIG. 1 is a diagrammatic plan view of a de-icing system in an aircraft, the system using a number of proportioning devices according to the present invention.
Figure 2:
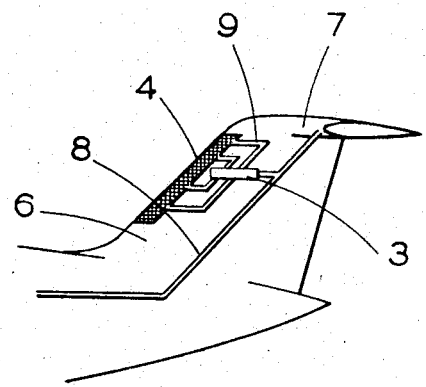
FIG. 2 is a diagrammatic side elevation of the tail section of the system shown in FIG. 1.

Referring firstly to FIGS. 1 and 2, the de-icing system comprises a small, electrically-driven, dual outlet metering pump 1 for supplying de-icing liquid from a tank or reservoir (not shown). The liquid is pumped at a controlled rate through microfilters 2 to proportioning devices 3. The proportioning devices 3 feed de-icing liquid to groups of distributors 4 installed in the leading edges of the wings 5, fin 6 and tail plane 7. Pipelines 8 between the pump 1 and proportioning devices 3 are of nylon and have 5/16" outside diameter, whilst pipelines 9 between the proportioning devices 3 and the distributors 4 are of nylon and have 3/16" outside diameter. The lengths of the pipelines 8 between one outlet of the pump 1 and the two proportioning devices 3 in the wings 5, are inversely proportional to the expected rate of liquid flow through the pipelines.

Figure 3:
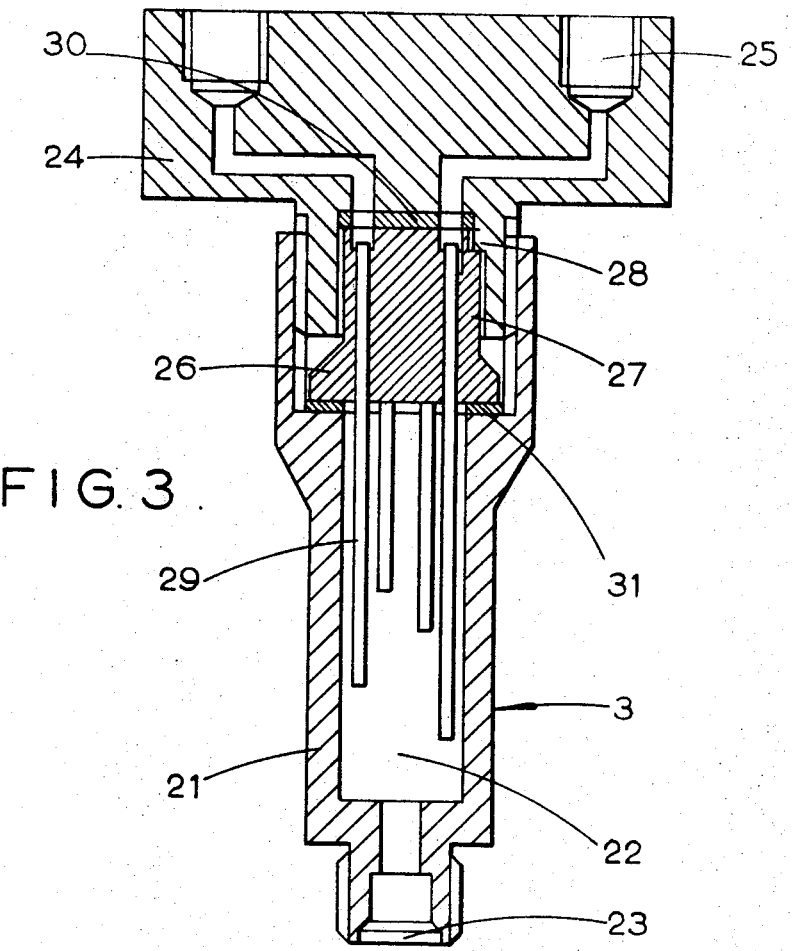
FIG. 3 is an axial section of one form of proportioning device according to the present invention.

FIG. 3 shows a proportioning device 3 in detail. The device comprises a body 21 of aluminium alloy enclosing a chamber 22 having a liquid inlet 23 at one end. A manifold 24 having a plurality of liquid outlets 25 is fixed to the body 21 at the other end of the chamber 22. The pipelines 8 and 9 (FIG. 1) are connected to the liquid inlet 23 and outlet 25, respectively. A hole in the manifold 24 accommodates a block 26 of non-metallic material, the block having an integral tongue or key 27 engaged in a slot 28 in the manifold 24 to ensure accurate positioning of the block in the manifold and to prevent undesired relative movement of these two parts. The block 26 may be formed of a cured epoxy resin, such as that sold under the trade mark Araldite, by casting the epoxy resin and hardening the same in a mould of silicone rubber. Cast into the block 26 are metering devices in the form of capillary tubes 29 which extend completely through the block and project by varying distances into the chamber 22. Each liquid outlet 25 is in communication with a respective one of the metering devices, the tongue 27 and slot 28 ensuring the correct alignment. A gasket 30 prevents leakage between any outlet 25 and another outlet 25 at the joint between the manifold 24 and the block 26. Similarly, a gasket 31 seals the chamber 22 from the outside of the block 26 and in addition fixes the block within the body 21.

The capillary tubes 29 are of nickel or of Monel metal. Since the body 21 is of aluminium alloy, it is preferred to provide a linking of plastics material or lacquer on the walls of the chamber 22 to avoid electrolytic corrosion being set up if the capillary tubes should contact the body. Also, an anchor disc (not shown) may be inserted in the chamber to prevent vibration of the longer capillary tubes. The anchor disc is of the same diameter as that of the chamber, and is formed with holes through which the capillary tubes pass and further holes to allow free communication within the chamber between the two sides of the disc.

The length of each capillary tube 29 is chosen in accordance with the rate of flow of liquid desired to be supplied to the distributor 4 associated with the tube, and taking into account the length of the pipeline 9 between the associated outlet 25 and the distributor 4. Preferably, each capillary tube is individually calibrated to avoid inaccuracies due to non-uniformity of the tubes.

The capacity of the chamber 22 is made as small as possible to accommodate the projecting ends of the capillary tubes 29 with the minimum of surrounding volume. For example, the proportioning device may comprise six or eight capillary tubes and have a capacity of about 2 cc.

In operation, a metered supply of de-icing liquid is pumped from the central tank or reservoir through the microfilters 2 to the liquid inlets 23 of the proportioning devices 3, thus displacing liquid already in the pipelines and the proportioning devices. By the arrangement noted above, the new liquid from a single pump outlet reaches all the inlets 23 at substantially the same time. If the liquid in the pipelines and the proportioning devices has cooled to ambient temperature due to the installation of these parts in the wings, fin and tailplane of the aircraft, the liquid will have a relatively high viscosity and will be sluggish. The tank or reservoir is preferably located in a warm zone of the aircraft to maintain the liquid at a lower viscosity. For this reason, the new liquid will flow more readily than the liquid already in the pipelines and proportioning devices. The advantage of arranging for the new liquid to reach the proportioning devices at substantially the same time is to ensure that the new liquid does not reach one proportioning device first, in which case it may be preferentially pumped through that one proportioning device due to its ready flowing characteristics whilst the remaining devices are correspondingly starved of liquid. Because the liquid is fed by the metering pump 1, the flow in the system is constant, whereby the pressure varies with the viscosity of the liquid. As an example of the variation of viscosity with temperature, it may be mentioned that for a typical de-icing liquid in a system such as is shown in FIGS. 1 and 2, the pressure is about 7 pounds per square inch at 0°C., and about 50 pounds per square inch at −30°C. The pressure at −30°C. may be about 16 times that at +20°C.

Having reached the chamber 22 of the proportioning device 3 shown in FIG. 3, the liquid passes at controlled rates through the capillary tubes 29 to the outlets 25. The liquid then flows along the pipelines 9 to the distributors 4.

The outlets 25 are shown in FIG. 3 as being angled to allow for all the pipelines 9 to be coupled to the proportioning device parallel to the axis thereof. Alternatively, the outlets 25 may be radial.

Other metering devices may replace the capillary tubes 29. For example, larger bore tubes containing calibrated, axial rods may be used. Holes may alternatively be drilled in the block 26 of varying, calibrated diameters. A further alternative involves the use of calibrated needle valves.

An advantage of the system described above is that the number of locations where there is a danger of leakage is reduced. The number of pipe couplings used in this system may be less than half the number of pipe couplings involving T-unions in a conventional system.

Figure 5:
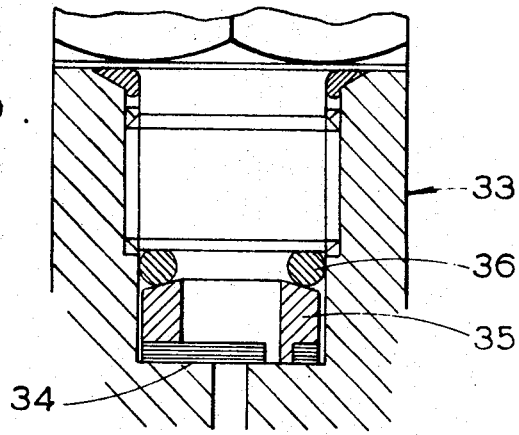
FIG. 5 is an enlarged sectional view of the valve used in the embodiment of FIG. 4.
Figure 4:
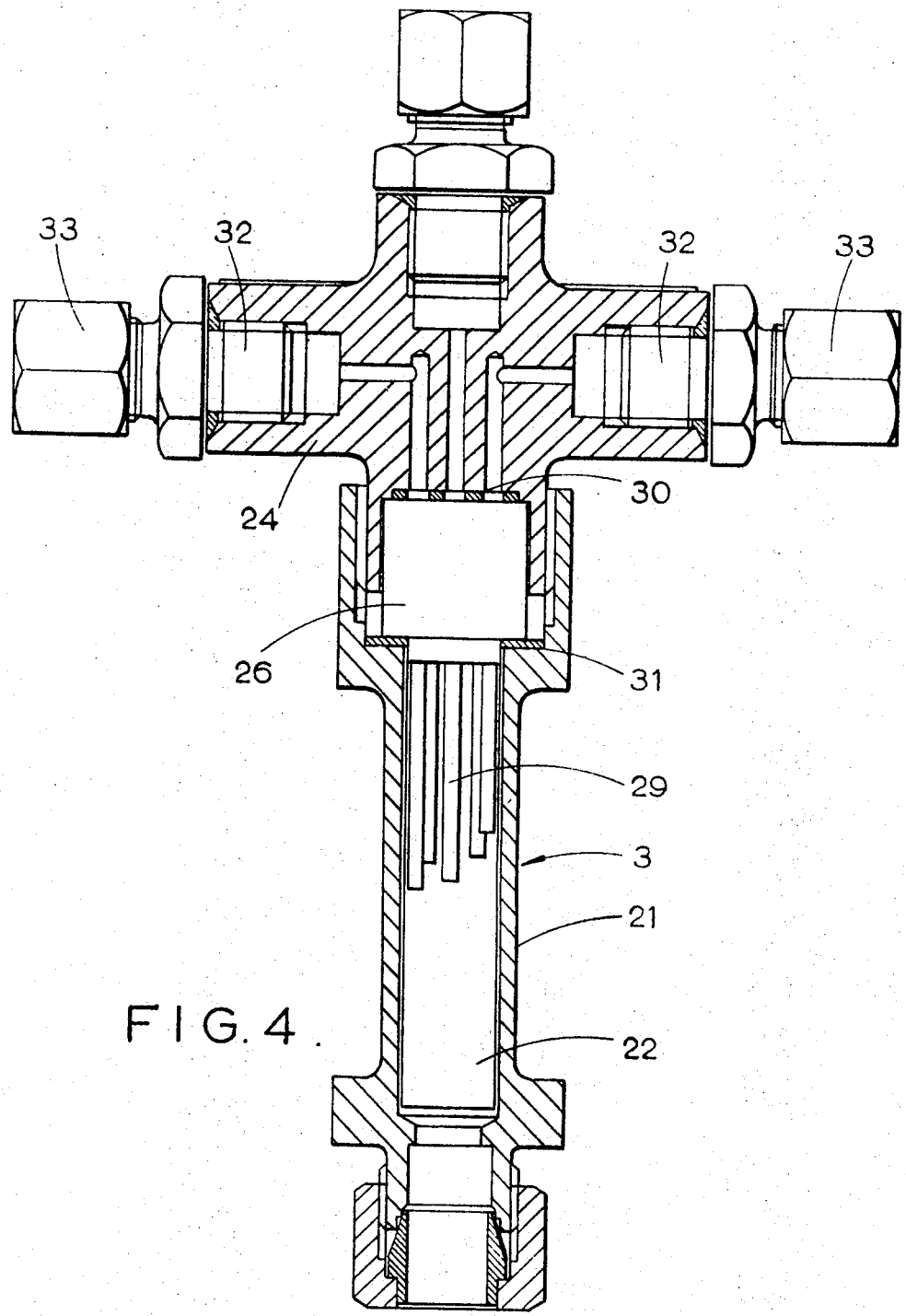
FIG. 4 is an axial section of a modified form of proportioning device according to the present invention.

FIGS. 4 and 5 illustrate a modification. FIG. 4 illustrates a modified proportioning device 3 in which one or more of several outlets 32 incorporates a non-return valve 33 shown in detail in FIG. 5. As shown in FIG. 5, each non-return valve 33 includes a resilient flap 34 secured in position by a retaining ring 35 and an O-ring 36.

We claim:

1. A liquid flow proportioning device comprising a body member having a chamber formed therein provided with an inlet opening and a plurality of outlet openings, means for connecting said inlet to a source of liquid under pressure and a plurality of metering tubes of different dimensions located in said body member and providing communication between said chamber and respective outlet openings whereby the liquid flow rates through said metering tubes are different by reason of the different dimensions thereof and the ratio of these rates is substantially independent of the temperature of the liquid handled by said device and wherein said metering tubes have substantially the same inside diameter and project into said chamber by varying distances.

2. The device of claim 1 including a non-return valve located in at least one of said outlets.

3. The device of claim 1 including means joining said metering tubes as a unit separably positioned in said body member with said metering tubes projecting into said chamber.